June 16, 1964     W. F. KYRYLUK     3,137,125
SOLAR MOTOR
Filed Feb. 26, 1962                          2 Sheets-Sheet 1
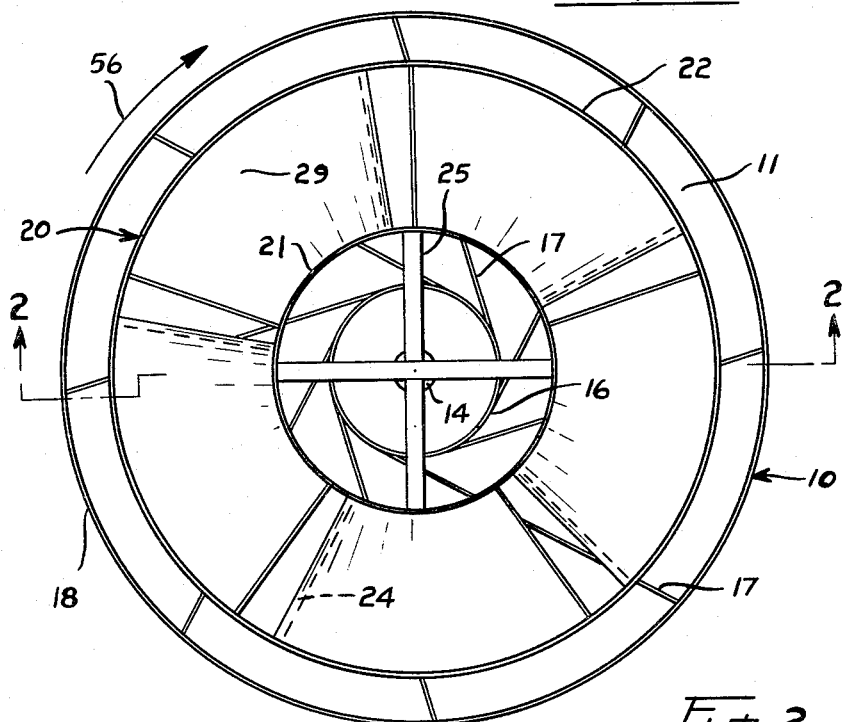
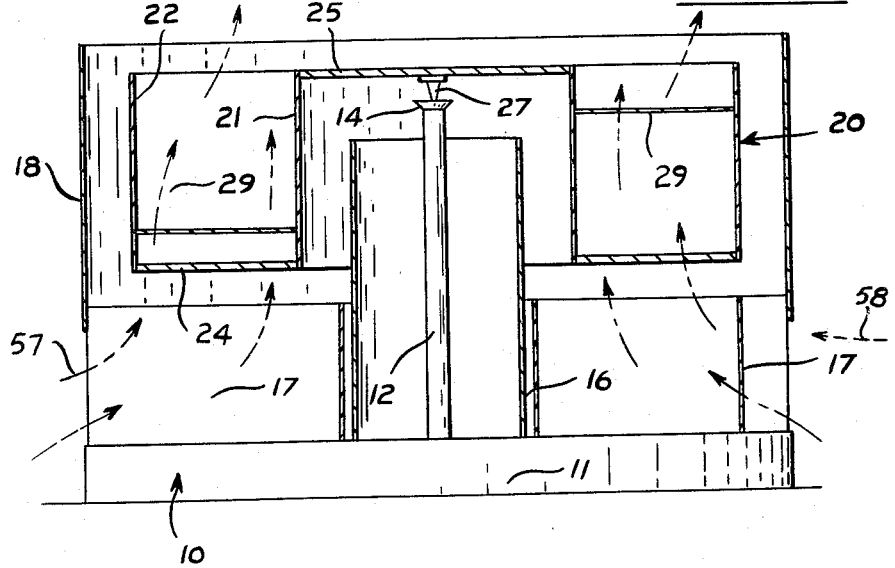
INVENTOR
William Frederick Kyryluk.

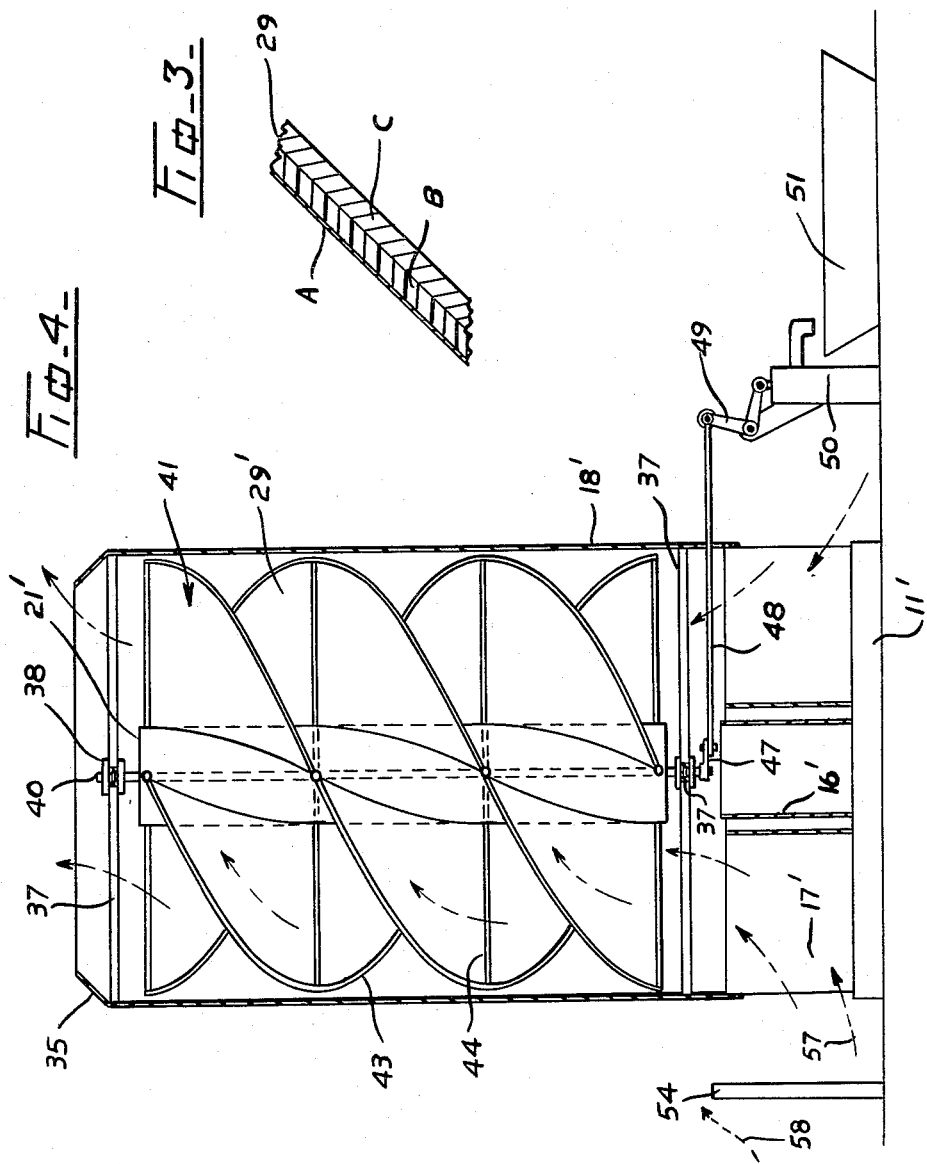

United States Patent Office 3,137,125
Patented June 16, 1964

3,137,125
SOLAR MOTOR
William Frederick Kyryluk, Los Angeles, Calif. (362 W. 18th Ave., Vancouver 10, British Columbia, Canada)
Filed Feb. 26, 1962, Ser. No. 175,846
4 Claims. (Cl. 60—26)

My invention relates to a motor which is adapted to receive radiant energy from the sun and convert it into useful mechanical energy.

An earlier device designed to transform solar energy into mechanical energy was the radiometer, an instrument used for measuring the intensity of radiant energy, and for similar purposes. Because of its limitations as to size and the fact that a partial vacuum is required no means could be found for modifying the radiometer so that it could do useful work.

The present invention contemplates a solar motor large enough and efficient enough to provide the necessary power to operate a water pump, for example. Such an installation would be particularly useful in pumping water in remote desert areas having ample sunshine. An important object of the invention is to provide a laminated rotor vane which will make maximum use of the sunlight it receives and convert it into useful energy with a high degree of efficiency.

Referring to the drawings:

FIGURE 1 is a plan view of the preferred embodiment of the solar motor.

FIGURE 2 is a vertical section taken on the line 2—2 of FIGURE 1 with parts of the motor being shown in elevation.

FIGURE 3 is an enlarged section of a portion of a rotor vane.

FIGURE 4 is a vertical section, part in elevation, of a modified form of the solar motor.

In the drawings like characters of reference indicate corresponding parts in each figure.

The solar motor is provide with a stator, generally indicated by the numeral 10, and consisting of a circular base 11 of wood or reinforced plastic. Mounted on the base 11 is a centrally disposed vertical support 12 which is fitted at its top end with a seat 14. This seat encloses a suitable bearing, not shown, which may be a diamond or glass, for example.

Enclosing the support 12 for a greater part of its height is an open-ended cylinder 16, preferably of clear transparent plastic, which cylinder is securely affixed to the base 11. A number of equidistantly spaced inlet vanes 17 are mounted on the base, which vanes may be formed of very thin transparent plastic. The vertical vanes 17 are disposed at a tangent to the outer periphery of the cylinder 16 and terminate near the outer edge of the stator base. Secured to the outer ends of the vanes 17 is an open-ended cylinder 18, again of thin plastic which is transparent, the lower edge of said cylinder being spaced above the base 11 to permit air to enter between the vanes.

The stator 10 supports a rotor 20 consisting of inner and outer concentrically disposed cylinders 21 and 22 respectively. Both these cylinders are open-ended structures and a clear, transparent and very thin plastic is used in their construction. The lower edges of the cylinders 21 and 22 are connected by a number of circumferentially spaced sticks 24. The upper end of the inner cylinder 21 is bridged by four radial arms 25. A steel pivot pin 27 is secured to the underside of the arms at the centre of the inner cylinder and the tip of this pin is journalled in the bearing carried by the seat 14.

The rotor 20 is fitted with several vanes 29, the lower edges of which are secured to the sticks 24. These vanes extend upwardly from their supporting sticks at an angle of substantially 45° to a horizontal plane and the side edges of said vanes may be suitably secured to the peripheries of the cylinders 21 and 22.

Referring now to FIG. 3 it will be seen that the vanes 29 are of laminate construction and are made up of three layers A, B and C. The bottom layer C is the thinnest commercially sold aluminum which is a good conductor of heat. Layer B is a semi-conductor of heat and is made up by mixing the following materials in the proportions noted:

2 parts carbon (powder form)
1 part lamp black (powder form)
4 parts metal lacquer (liquid)

The above noted materials are very thoroughly mixed and a thin coat of the mixture is applied very evenly to the bottom layer C using a small, fine paint brush. This is allowed to dry for a day. Layer A is intended to be a poor conductor of heat and must be clear and transparent to allow the sun's radiant energy therethrough. To form layer A one of the following materials may be used, clear varnish, lacquer, enamel or plastic. This is applied to the dried layer B as a spray, a single thin coat only being applied and allowed to dry for approximately two days.

In the above described manner the vanes 29 are constructed to form what might be referred to as an absorbent transformer since the vanes are designed to absorb the sun's radiant energy and transform it into heat energy. When assembling the vanes in the rotor great care should be taken not to tough the underside of the aluminum layer C since finger grease will cut down the efficiency of the unit. The thickness of the vanes 29 is less than .015 of a millimeter but this has been found to provide sufficient structural strength. If the cost of the vanes is not a consideration and even greater efficiency is desired layer C can be made of silver, layer B of silicon (treated with lamp black or the like to improve its heat absorbent qualities) and layer A can be formed of boron.

The modified form of the solar motor shown in FIG. 4 has a stator consisting of a base $11^1$, cylinder $16^1$, vanes $17^1$, and an outer cylinder $18^1$ all of which are constructed substantially as before. A cone-shaped extension 35 is fitted to the top of the cylinder $18^1$ which extension is intended to give a Venturi effect to the air flowing upwardly through said cylinder. The cylinder $18^1$ is fitted at each open end with reinforcing spokes 37 which are formed preferably of thin aluminum tubing. A roller bearing 38 is provided at the hub formed by the radial spokes at each end of the cylinder.

Journalled in the bearings 38 is the tubular aluminum shaft 40 of a modified stator 41. In this instance the stator has an inner cylinder $21^1$ only and the vanes $29^1$ are helically wound around this cylinder and are suitably secured thereto. The outer edges of the vanes are reinforced by thin wooden strips 43 and at suitable intervals said strips are supported by vertically spaced strips 44, also of thin wood. The strips 44 are horizontally and radially disposed and extend through the cylinder $21^1$ for connection to the shaft 40. Thus a strong lightweight rotor is constructed and it will be noted that the clearance between the strips 43 and the inner periphery of the cylinder $18^1$ is made as small as possible.

Beneath the lower bearing 38 a crank 47 is fitted to the shaft 40 and said crank is connected by a rod 48 to the operating handle 49 of a water pump 50. The pump may be intended to draw water from a well and discharge it into a container 51. However this mechanism is shown only as an example of the use to which the solar motor may be put and detailed description is deemed unnecessary.

A fence 54 may be erected around the base of the motor on the side or sides of the prevailing winds to protect the rotor from excessive strain. It is thought that these prevailing winds blowing over the top of the cone-shaped extenstion 35 will produce a negative pressure area which will draw air up through the motor and thereby increase its power output.

In the operation of both forms of the solar motor the sun's radiant energy falls upon the vanes 29 and passes through the top layer A, striking the surface of layer B where it becomes heat energy. Because layer B is very thin it heats very quickly and being a semi-conductor of heat also heats fairly evenly throughout. Layer A which is a relatively poor conductor of heat will restrict heat flow in an upward direction and in doing so will achieve what might be referred to as a greenhouse effect. Thus the heat in layer B will flow into layer C which is a good conductor of heat and since it has this property will readily heat the air immediately below the vanes.

The air heated in this manner expands and tends to rise by convection and in doing so will exert a pressure on the underside of the rotor vanes so as to rotate the rotor in the direction of the arrow 56 of FIG. 1. The flow of air through the motor is indicated by the chain dotted arrows 57 of FIGS. 2 and 4. If a wind is blowing near ground lever, as shown by the dotted arrows 58 of FIGS. 2 and 4, this ground wind is directed by the vanes 17 so as to flow upwardly and augment the driving force applied to the vanes 29 by the convection currents. The rotor continues to revolve at a fairly constant speed as long as the heat affects the rotor vanes. The reaction is the same but not as strong when artificial light is applied to these vanes.

The cylinders 21 and 22 prevent the rising air from escaping to the side and the space between the cylinder 22 and the stator cylinder 18 provide for by-pass cooling. It should be mentioned here that force of pressure created by the expansion of air being heated beneath the vanes is of little significance as compared to the force of the lifting heated air (as the principle used in the radiometer).

What is claimed in my invention:

1. In a solar motor having a rotor fitted with vanes adapted to impart rotation to the rotor in response to thermal currents moving substantially parallel to the longitudinal axis of the rotor, said vanes comprising a bottom, intermediate and top layer, said bottom layer being a good conductor of heat, said intermediate layer being a fair conductor of heat and said top layer being a poor conductor of heat whereby solar heat is amplified by the top layer for storage in the intermediate layer and subsequent transfer by the bottom layer to the air beneath the rotor vane.

2. Structure as claimed in claim 1 wherein the bottom layer is a very thin sheet of metallic material.

3. Structure as claimed in claim 2, wherein the intermediate layer is a relatively thick sheet of opaque material.

4. Structure as claimed in claim 3, wherein the top layer is a coating of transparent material.

References Cited in the file of this patent

UNITED STATES PATENTS

| | | |
|---|---|---|
| 2,597,890 | Monk | May 27, 1952 |
| 3,031,852 | White | May 1, 1962 |
| 3,048,006 | Goodman | Aug. 7, 1962 |

FOREIGN PATENTS

| | | |
|---|---|---|
| 1,109,568 | France | Sept. 28, 1955 |